United States Patent [19]

Miyagawa et al.

[11] 4,277,157
[45] Jul. 7, 1981

[54] LENS TUBE RETRACTION MECHANISM FOR CAMERA HAVING RETRACTABLE LENS TUBE

[75] Inventors: Fumihiro Miyagawa; Kousaku Sawabe, both of Yokohama, Japan

[73] Assignee: Ricoh Company, Ltd., Japan

[21] Appl. No.: 43,665

[22] Filed: May 30, 1979

[30] Foreign Application Priority Data

Jun. 6, 1978 [JP] Japan .................................. 53/68059
Jun. 15, 1978 [JP] Japan .................................. 53/72832

[51] Int. Cl.$^3$ ............................................ G03B 17/04
[52] U.S. Cl. .................................................. 354/187
[58] Field of Search ............................... 354/187–195, 354/288

[56] References Cited

FOREIGN PATENT DOCUMENTS 2404687 8/1975 Fed. Rep. of Germany ............ 354/187
2825000 12/1978 Fed. Rep. of Germany ............ 354/187

*Primary Examiner*—John Gonzales
*Attorney, Agent, or Firm*—McGlew and Tuttle

[57] ABSTRACT

The lens tube retraction mechanism for a camera having a lens tube which is slidable relative to a body of the camera between a photographing position and a retracted position includes on each of the opposite sides of the camera a roller which is engaged with part of the lens tube, a pusher lever capable of fixing the lens tube at the photographing position by holding the roller, and an intermediate lever having a slot for allowing a shaft portion of the roller to pass therethrough, for moving the roller, enabling the lens tube to take the photographing position and the retracted position.

When the lens tube is retracted by pushing the intermediate lever inwards, the pusher lever is first moved upwards by the intermediate lever so as to be disengaged from the roller, whereby the lens tube can be retracted lightly although the lens tube can be held tightly when it is projected at the photographing position. Furthermore, in the intermediate lever, a spring and a pin are disposed for positioning the roller at the same position in a slot of the intermediate lever, whereby the tilting of the lens tube is prevented when the lens tube is projected and retracted.

3 Claims, 11 Drawing Figures

LENS TUBE RETRACTION MECHANISM FOR CAMERA HAVING RETRACTABLE LENS TUBE

BACKGROUND OF THE INVENTION

The present invention relates to a lens tube retraction mechanism for a camera having a lens tube which is slidable relative to the body of the camera between a photographing position and a retracted position and more particularly to a lens tube retraction mechanism capable of retracting and projecting a retractable lens tube smoothly and lightly while the lens tube supporting capability is increased when the lens tube is projected to the photographing position.

Conventionally, various lens tube retraction mechanisms have been proposed, such as a type moving a pusher lever upwards quickly by a roller which is engaged with a lens tube, a type moving a wedge upwards quickly by a roller, a bayonet type and a link type.

Referring to FIGS. 1 and 2, there is shown a conventional lens tube retraction mechanism of the type moving a pusher lever upwards by a roller.

As can be seen from FIGS. 1 and 2, the same members of the lens tube retraction mechanism are symmetrically disposed on the opposite sides of the camera. However, for simplification and convenience of explanation only, the members disposed on one side of the camera will be explained hereinafter.

In FIGS. 1 and 2, transverse grooves 21g and 21h are formed in opposite side walls of a lens tube guide frame 21 which is disposed inside a camera body 1. The shaft portions of a pair of rollers 41 are arranged so that each shaft portion passes through the transverse grooves 21g and 21h and is engaged with a lens tube support member 2b of a lens tube 2 which is disposed inside the lens tube guide frame 21. The shaft portion of each roller 41 is fitted into a slot 4a formed in one end portion of each of a pair of intermediate levers 4. A projected portion 8b of a pusher lever 8 which is situated above the roller 41 is engaged with the roller 41, and the pusher lever 8 is urged downwards by coil springs 83, guided by slots 8e formed in the pusher lever 8, so that the lens tube 2 can be selectively positioned at either a projected position or a retracted position by the intermediate levers 4 which are respectively linked with a retraction operation lever 32 of the lens tube 2.

In this retraction mechanism, when the lens tube 2 is retracted from the projected photographing position to the retracted position by pushing the intermediate lever 4 inwards through the retraction operation lever 32, the intermediate lever 4 pushes the lever 8 upwards. However, since no force other than a frictional force is applied to the roller 41, the position of the roller 41 in the slot 4a of the intermediate lever 4 is indefinite and, accordingly, the roller 41 is not always at one extreme end of the slot 4a. Furthermore, it may occur that the shaft portion of each roller 41 is not in the same position within the slot 4a of each intermediate lever 4. In other words the two intermediate levers 4 may be in different positions in relation with the opposite rollers 41. If the retraction operation is performed while the two intermediate levers 4 are in different positions, different forces are applied to the lens tube 2 from the opposite sides thereof so that the lens tube 2 is tilted, which keeps the retraction operation from being smooth.

Furthermore, as mentioned previously, when the lens tube 2 is retracted from the photographing position to the retracted position by pushing the intermediate levers 4 inwards through the retraction operation levers 32, each intermediate lever 4 pushes the lever 8 upwards. In this case, when the force necessary for moving the pusher lever 8 upwards is reduced by weakening the resilient force of the coil springs 83, the lens tube supporting capability is reduced and the lens tube 2 cannot be fixed securely, so that the position of the lens tube 2 cannot be determined securely and accurately. Thus may tilt the lens tube 2 in the lens tube guide frame 21, causing one side of a photograph to become out of focus. On the other hand, when the lens tube supporting capability is increased by means of stronger springs 83, the retraction operation becomes heavy and difficult.

Referring to FIG. 3, there is schematically shown part of the lens tube retraction mechanism of the type of moving a wedge upwards by a roller. In FIG. 3, when a front cover 3 is closed, the intermediate lever 4 rotates a wedge lever 9 counterclockwise about a shaft 91 and, at the same time, a pin 46 which is engaged with the lens tube 2 is caused to slide within the transverse groove 21g. In this lens tube retraction mechanism, the mechanical construction must be such that the strength of the retraction mechanism is sufficient to protect the mechanism against having a great outer force applied thereto. Therefore, the mechanism becomes complex, and precision parts are necessary. Furthermore, in a bayonet type of mechanism projection and retraction of the lens tube cannot be performed by one-touch operation. The link type of mechanism also has the same shortcoming as the bayonet type.

SUMMARY OF THE INVENTION

It is therefore a primary object of the present invention to provide a lens tube retraction mechanism for a camera of the type having a retractable lens tube, capable of retracting the lens tube lightly as well as holding the lens tube securely, without increasing the force necessary for retracting the lens tube.

Another object of the present invention is to provide a lens tube retraction mechanism of a camera having a retractable lens tube, capable of preventing the lens tube from tilting within the camera while retracting and projecting the lens tube in order to attain smooth operation of the lens tube retraction mechanism.

A lens tube retraction mechanism for retracting a lens tube according to the invention comprises a retractable lens tube capable of being moved between a photographing position and a retracted position. A roller is engaged with part of the retractable lens and is moved by an intermediate lever, enabling the the retractable lens tube to be moved into either the photographing position or the retracted position. A pusher lever is provided which is capable of fixing the lens tube at the photographing position by pushing the roller when the lens tube is projected and, in operation, the roller is moved by an end portion of a slot of the intermediate lever so as to retract the lens tube at the retracted position after the pusher lever is moved upwards by the intermediate lever.

More specifically, when the lens tube is retracted, the intermediate lever comes under a projected portion of the pusher lever so as to push the pusher lever upwards first. Therefore, even if the roller is provided with a strong force for holding the lens tube by setting a large wedge angle between the roller and the pusher lever, the lens tube can be retracted lightly while the projected lens tube is firmly held by the roller. On the other hand, when the lens tube is projected, the lens tube can be held more firmly and securely, with the roller held firmly by the pusher lever because the holding force of the pusher lever can be increased, without taking into consideration a force which might be necessary when the lens tube is retracted since the holding force of the pusher lever has nothing to do with the force necessary for the retraction.

Furthermore, in the retraction mechanism according to the present invention, a spring and a pin are disposed in the intermediate lever, and the spring and the pin always push the roller in a slot of the intermediate lever in one direction. Each roller on the opposite sides of the lens tube is always in the same position, and accordingly the lens tube is not tilted in a lens tube guide frame when each roller is pushed by the intermediate lever. In combination with the above-mentioned pusher lever releasing mechanism, this mechanism also attains the smooth operation for retracting and projecting the lens tube.

Thus, according to the present invention, the lens tube can be held firmly and securely by a simple mechanism, without defocusing one side of photograph since tilting of the lens tube does not occur.

BRIEF DESCRIPTION OF THE DRAWINGS

For a better understanding of the present invention as well as the objects and other features thereof, reference will be made to the following detailed description which is to be read in conjunction with the drawings wherein.

DETAILED DESCRIPTION OF THE PREFERRED EMBODIMENTS

Figure 1:
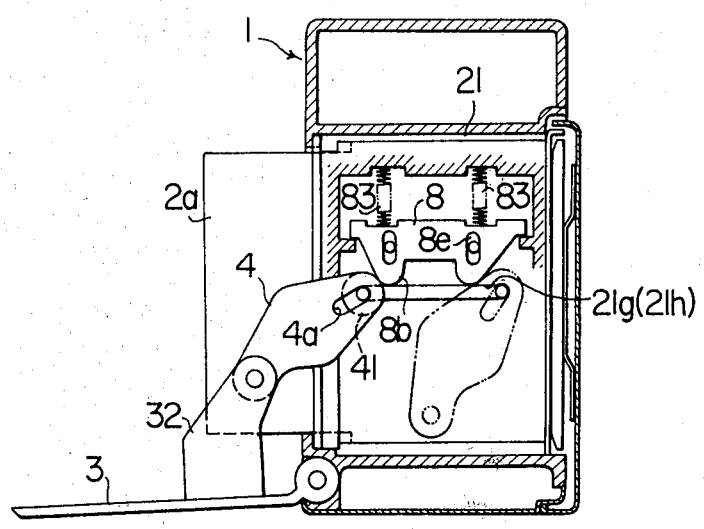
FIG. 1 is a diagrammatic drawing of a conventional retraction mechanism for a lens tube of a camera having a retractable lens.
Figure 2:
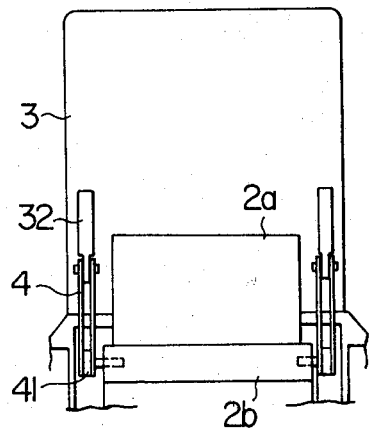
FIG. 2 is a partial diagrammatic drawing of the conventional retraction mechanism of FIG. 1, which particularly illustrates the linkage of an intermediate lever and a lens tube of the conventional retraction mechanism.
Figure 3:
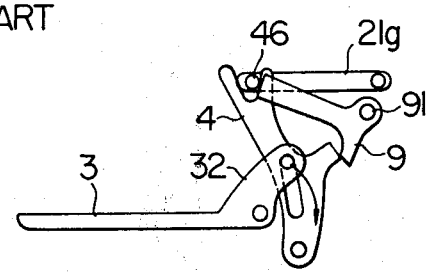
FIG. 3 is a partial diagrammatic drawing of another conventional retraction mechanism of a type of moving a wedge upwards by a roller.
Figure 4:
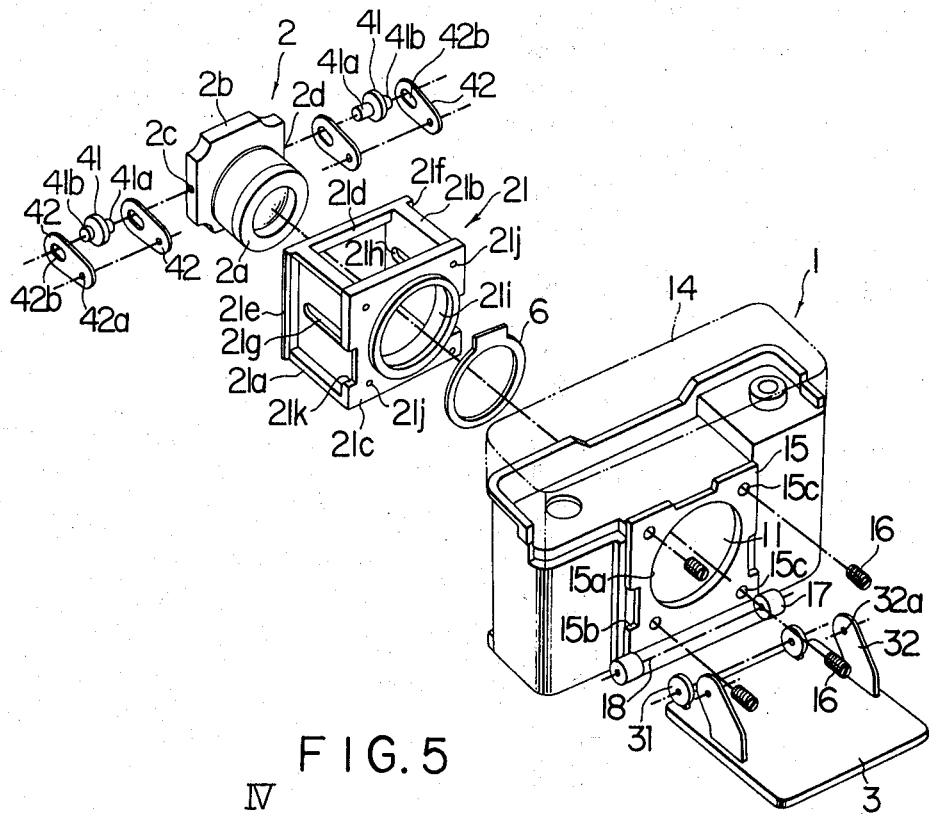
FIG. 4 is an exploded fragmentary perspective illustration of a camera incorporating one embodiment of the present invention.
Figure 5:
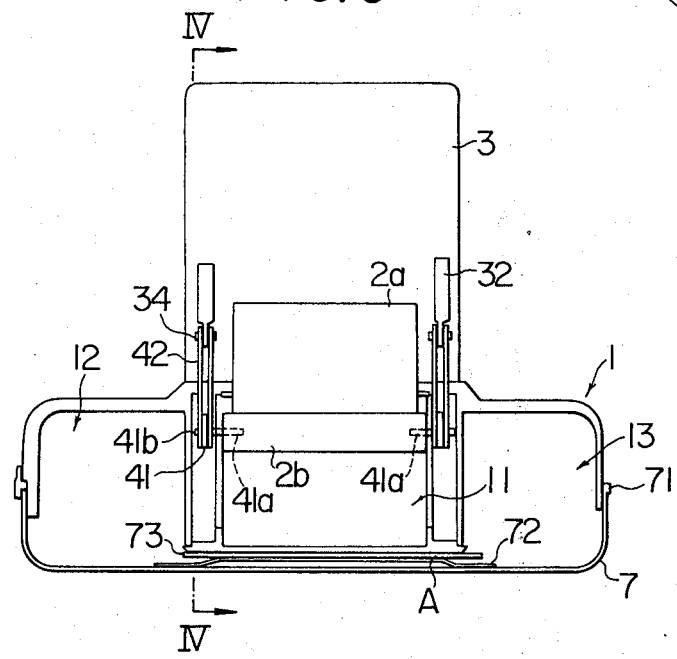
FIG. 5 is a schematic transverse sectional view of the camera of FIG. 4.

Referring to FIGS. 4 and 5, there is shown an embodiment of a retraction mechanism according to the present invention for a camera of the type having a retractable lens tube. In this type of camera, the lens tube 2 is retractably attached to the camera body 1 cooperatively with the front lid 3. Chambers 12 and 13 located on the opposite sides of a lightproof box 11 in which the lens tube 2 is disposed are film chambers. Above the lightproof box 11, there is situated a mechanical chamber 14 for holding an exposure control mechanism and a viewfinder mechanism therein. On the central front side of the camera body 1, there is disposed a front plate 15 which is integral with the camera body 1. In the front plate 15, there is formed a hole 15a for allowing a lens tube portion 2a of the lens-barrel 2 to be fitted thereinto.

As illustrated in FIG. 4, the lens tube 2 comprises the lens tube portion 2a and a lens tube support portion 2b in which a shutter mechanism is located. On the outside of the lens tube 2, there is disposed the lens tube guide frame 21, which has a U-shaped or box-shaped cross-section. The lens tube guide frame 21 comprises two side walls 21a and 21b on the opening side of the lens tube guide frame 21, a central wall 21c facing the opening side, upper and lower transverse beams 21d connecting the side walls 21a and 21b and projected portions 21e and 21f which are projected from the opposite ends of the side walls 21a and 21b. In the respective middle portions of the side walls 21a and 21b, there are formed transverse grooves 21g and 21h and, in the central side wall 21c, there is formed an opening 21i into which the lens tube portion 2a fits. The upper and lower beams 21d and the projected portions 21e and 21f constitute a film receiving portion. On the outer surface of the film receiving portion, there is formed a rail surface A comprising a pair of parallel projected rails, with one rail in an upper portion of the film receiving portion and the other rail in a lower portion thereof.

With holes 2c and 2d formed on the opposite sides of the lens support portion 2b, there are engaged shaft portions 41a of the rollers 41. Each roller 41 is attached to one end of each of the intermediate levers 4. With a ring-shaped lightproof member 6 attached around the outer peripheral portion of the lens tube portion 2a, the lens tube guide frame 21 is inserted into the lightproof box 11 from the back side of the camera body 1. The lens tube guide frame 21 thus inserted into the camera body 1 is fixed to the front plate 15, with screws 16 screwed into holes 15c formed in the front plate 15 and into tapped holes 21j formed in the central side wall 21c. At this time, a front end portion of the lens tube portion 2a is projected to the front side of the camera body 1, passing through the holes 21i and 15a. On the back side of the camera body 1, a back lid 7 is pivotally mounted on a hinge 71. To the inside of the back lid 7, a film pressure plate 73 is attached by means of a spring 72 so that a film (not shown) is brought into pressure contact with the rail surface A of the film receiving portion by the film pressure plate 73. The front lid 3 which is attached to the front side of the camera body 1 is pivotally mounted so as to be opened and closed through a shaft 18 which passes through a shaft support portion 17 attached to the camera body 1.

Figure 6:
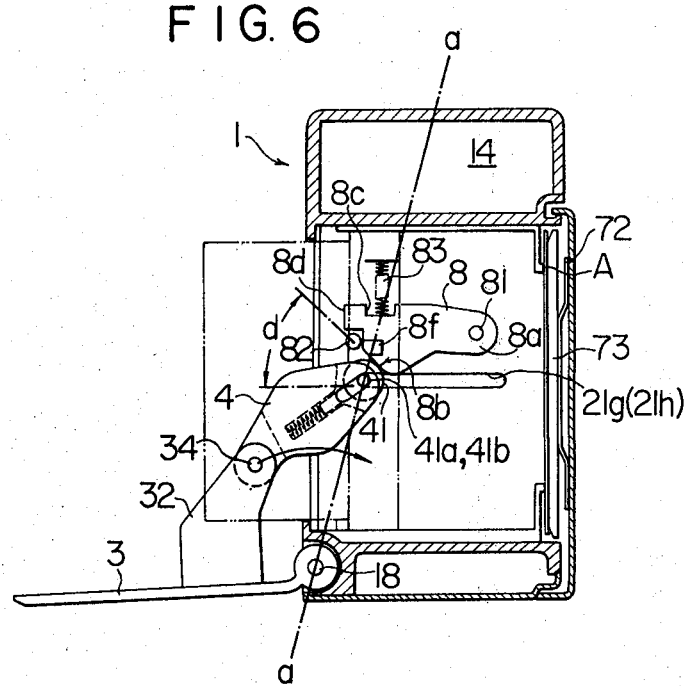
FIG. 6 is a schematic sectional view taken on line IV—IV of FIG. 5.
Figure 7:
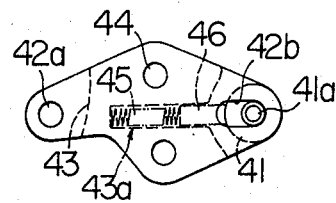
FIG. 7 is a schematic plan view of an intermediate lever of the illustrated embodiment of the present invention.
Figure 8:
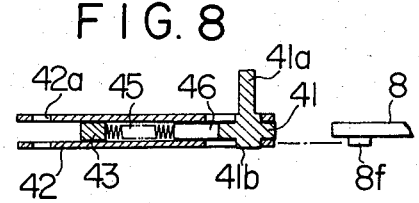
FIG. 8 is a schematic cross sectional view of the intermediate lever of FIG. 7.

In order for the lens tube 2 to be retractable cooperatively with the front lid 3, a retraction operation member is constructed by fixing one end portion of each of levers 32 to the opposite end portions of the front lid 3, which acts as an arm member for lever 32, and fitting a pin or link 34 into a hole 42a of a plate 42 of each intermediate lever 4 and into a hole formed in the other end portion of each lever 32, so that each intermediate lever 4 is swingable in relation to each lever 32 as shown in FIGS. 5 and 6. As shown in FIGS. 7 and 8, the intermediate lever 4 is constructed by fixing a thick plate 43 held between a pair of plates 42 by screws 44. In the thick plate 43, there is formed a slot 43a. In one end portion of the respective pair of plates 42, there is formed a hole 42a for allowing the pin 34 (FIG. 5) to be fitted therein and, in the other end portion of the respective two plates 42, there is formed a slot 42b in which shaft portions 41a and 41b of the roller 41 are fitted. In the slot 43a, there are fitted a pin 46 and a spring 45. One end of the pin 46 is pressed into contact with the outer peripheral surface of the roller 41 by the spring 45, so that the shaft portion of the roller 41 is in pressure contact with one end of the slot 42b. The shaft portion 41a of the roller 41 is inserted into the transverse grooves 21g and 21h formed in the side walls 21a and 21b of the lens tube guide frame 21 and engaged with the holes 2c and 2d formed in the opposite sides of the lens tube support portion 2b of the lens tube 2. On each side of the lens tube guide frame 21, two pins 81 and 82 are embedded and the pin 81 is fitted into a hole formed in one end portion 8a of the pusher lever 8 so that the pusher lever 8 is swingable about the pin 81. In a lower portion of the pusher lever 8, there is formed a downwardly projected portion 8b, while in an upper portion of the pusher lever 8, there is formed a concave portion 8c. In a top portion of the pusher lever 8, there is formed a notch portion 8d. The projected portion 8b is in contact with the roller 41 and, between the concave portion 8c and a stationary portion of the lens tube guide frame 21, there is connected an expanding spring 83 so that the pusher lever 8 is always urged downwards. Under the notch 8d, there is disposed the pin 82. Furthermore, beside the notch portion 8d, there is formed a portion 8f projected so as to be engageable with the intermediate lever 4.

When this camera is assembled, the lens tube support portion 2b is inserted after confirming that the lens tube support portion 2b moves smoothly within the lens tube guide frame 21. The pusher lever 8 is attached to the pin 81 of the lens tube guide frame 21 and the expansion spring 83 is connected to the pusher lever 8. With the holes 2c and 2d formed in the opposite sides of the lens tube support portion 2b, there is engaged the shaft portion 41a of the roller 41 which is attached to the intermediate lever 4, passing through the transverse grooves 21g and 21h and a top portion of the intermediate lever 4 is projected to the front side of the camera body 1 from the grooves 21k formed in the opposite sides of the center side wall 21c and from grooves 15b formed in the opposite sides of the front plate 15. The intermediate lever 4 and the lever 32, which serves as the retraction operation member, are connected by a pin 34 by making hole 42a formed in a top portion of the intermediate lever 4 coincide with a hole in a top portion of the lever 32. This connection can be made by use of a flanged pin 34 and a clip in combination.

Figure 9:
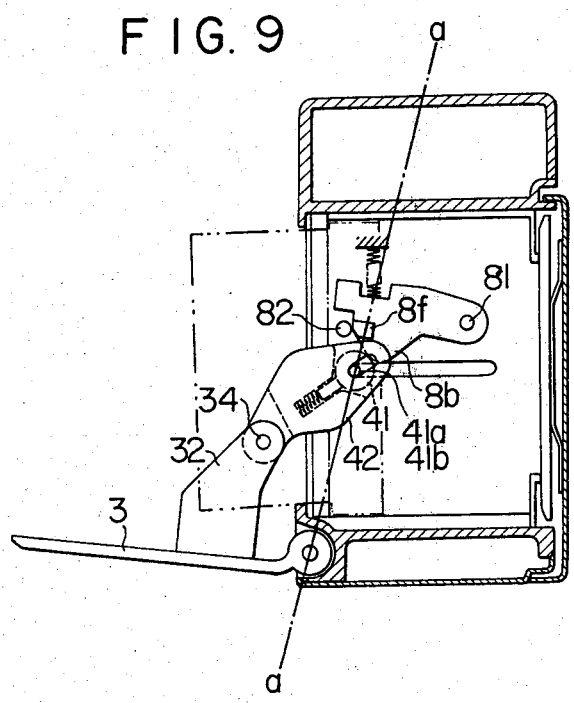
FIG. 9 is a schematic sectional view taken on line IV—IV of FIG. 5, in which the front lid is slightly turned in the closing or opening direction thereof.
Figure 11:
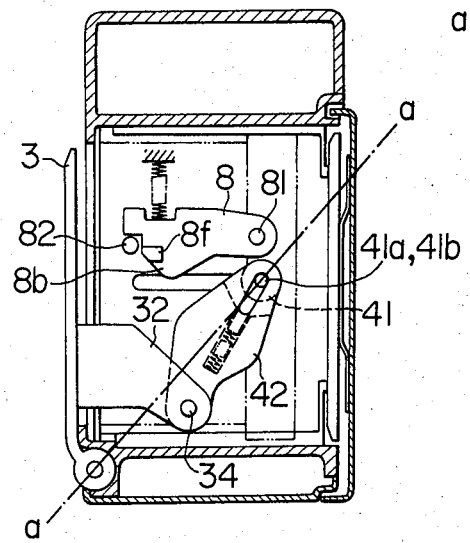
FIG. 11 is a schematic sectional view taken on line IV—IV of FIG. 5, in which the front lid is closed.

When the lever 32 and the intermediate lever 4 are connected in the above-mentioned manner, the operation of the mechanism may be described with respect to a line a—a that passes through the shaft 18 and through the shaft portion 41b of the roller 41. The front lid 3 is pushed by a surface of the projected portion 8b of the pusher lever 8, so that the front lid is opened abruptly, when the pin 34 is positioned on the left side of the line a—a as shown in FIG. 6. When the front lid 3 is turned in the closing direction, the intermediate lever 4 is moved to the right, with the shaft portion 41a of the roller 41 sliding within the transverse grooves 21g and 21h. A curved surface of the end portion of the intermediate lever 4 engage the lower surface of the projected portion 8f of the pusher lever 8 and when the intermediate lever 4 is further pushed to the right, the end portion of the intermediate lever 4 pushes the projected portion 8f upwards as illustrated in FIG. 9. During this step, the pin 34 is rotated clockwise about the shaft 18, namely in the direction of the arrow in FIG. 6. Then the roller 41 goes over the projected portion 8b of the pusher lever 8 and is caused to slide to the right side in the figure. When the pin 34 is then moved to the right beyond the line a—a, the roller 41 is pushed by the spring 45 and the pin 46 to the extreme end of the slot 42b in the direction of the end portion of the intermediate lever 4, so that a transfer movement of the intermediate lever 4 is mechanically changed into a counterclockwise rotation about the shaft portion 41b and the front lid 3 is closed suddenly as shown in FIG. 11. In this position, the lens tube 2 is retracted and pushed into the lightproof box 11 and the front lid 3 is closed so as to cover the lens tube 2. When the retracted lens tube portion 2a is pulled out, the above-mentioned operation is performed in reverse. Namely, when the front lid 3 is opened, the pin 34 is moved to the left side from the right side of the line a—a in FIG. 11 and when it is moved to the left beyond the line a—a, the shaft portion 41a is caused to slide fast within the transverse grooves 21g and 21h from the right to the left so that the lens tube portion 2a is projected to the front side of the camera body 1.

Figure 10:
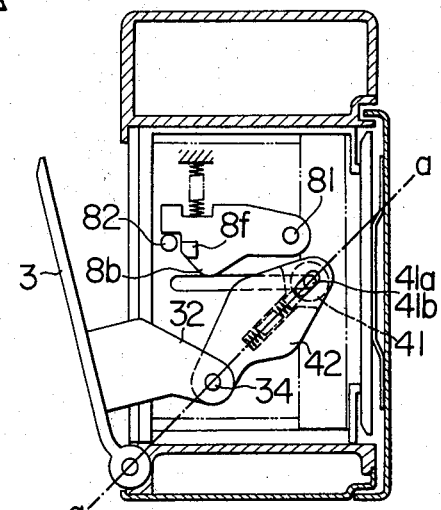
FIG. 10 is a schematic sectional view taken on line IV—IV of FIG. 5, in which the front lid is turned in the closing or opening direction thereof so that a pin on a line a—a which connects a rotating shaft of the front lid and a roller fitted in the intermediate lever.

In the above-mentioned retraction and pulling operations of the lens tube 2, the roller 41 is always pushed to one extreme end of the slot 42b formed in the plate 42 of the intermediate lever 4 by the spring 45 and the pin 46. Therefore, the position of the roller 41 is fixed. When the pin 34 comes onto the line a—a as shown in FIG. 10., the intermediate lever 4 pushes the spring 45 and the roller 41 is moved. However, when the pin 34 goes over the line a—a, the spring 45 works in the pulling direction and the intermediate lever 4 is rotated while the roller 41 is in pressure contact with one extreme end of the slot 42b. Therefore, the position of each roller 41 on the opposite sides is kept at a predetermined position either when the intermediate lever 4 pushes the pusher lever 8 upwards or when the lens tube 2 is retracted. Accordingly, different forces are not applied to the opposite sides of the lens tube 2. This makes it possible to perform smooth retraction of the lens tube 2.

Furthermore, in the retraction operation of the lens tube 2, the pusher lever 8 is moved upwards, with an end portion of the intermediate lever 4 coming under the projected portion 8f of the pusher lever 8 and pushing the pusher lever 8, while the pusher lever 8 pushes the roller 41. Therefore, the intermediate lever 4 can be moved lightly thereafter. Such light movement of the intermediate lever 4 can be attained likewise even if the roller 41 is tightly pressed by the pusher lever 4 through the expansion spring 83 and the roller 41 is provided with a strong force for holding the lens tube 2 with a large wedge angle d as illustrated in FIG. 6. On the other hand, when the lens tube 2 is pulled out and held by the pusher lever 2, the roller 41 is pressed tightly by the surface of the projected portion 8b of the pusher lever 2 with a great wedge angle d, so that the lens tube 2 is tightly pressed against a standard surface of the central side plate 21c of the lens tube guide frame 21, with the lens tube supporting power enhanced.

What is claimed is:

1. In a camera of the type having a retractable lens tube, the invention comprising:
    a lens tube movable between a photographing location and a retracted location in the camera;
    a roller with a shaft engaged with part of said lens tube;
    an intermediate lever for moving said roller between a first position for placing said lens tube at said photographic location and a second position for placing said lens tube at said retracted location, said intermediate lever having a slot for receiving and permitting movement of said roller shaft therein;
    an operation member pivotally connected at a link to said intermediate lever for moving said lens tube;
    a pusher lever to hold said lens tube at photographing location movably mounted to the camera and having a surface engageable with said roller to push said roller when said lens tube is in and near said photographing location; and
    biasing means connected to said pusher lever to bias said pusher lever toward said roller;
    said pusher lever having a free end portion, and a projected portion formed at said free end portion of said pusher lever, said intermediate lever engageable with said projected portion of said pusher lever to move said pusher lever against the bias of said biasing means before said roller moves said pusher lever to move said lens tube out of said photographing location, said roller shaft moving in said slot of said intermediate lever to an end thereof toward said link before said roller moves said pusher lever.

2. In a camera as claimed in claim 1, the invention including spring means connected to said intermediate lever to push said roller toward one end of said slot of said intermediate lever away from said link, an arm member connected to said operation member and hinged to the camera at a hinge, said link passing a line projected between said roller shaft and said hinge when said lens tube is in said retracted location to retain said lens tube in said retracted location through the action of said spring means.

3. In a camera as claimed in claim 1, the invention including said intermediate lever comprising, a pair of outer plates, an intermediate plate connected between said pair of outer plates having an elongated opening, said slot in said intermediate lever comprising a pair of aligned slots in said pair of outer plates communicating with said elongated opening of said intermediate plate, said spring means comprising a spring in said elongated opening and a pin between said spring and said roller.

* * * * *